US007156238B2

(12) United States Patent  
Elbersen

(10) Patent No.: US 7,156,238 B2  
(45) Date of Patent: Jan. 2, 2007

(54) APPARATUS FOR INSPECTING SEALED PACKAGES

(76) Inventor: Petrus Franciscus Elbersen, Veldstraat 59, AA Deurne 5751 (NL)

( * ) Notice: Subject to any disclaimer, the term of this patent is extended or adjusted under 35 U.S.C. 154(b) by 219 days.

(21) Appl. No.: 10/683,112

(22) Filed: Oct. 14, 2003

(65) Prior Publication Data

US 2004/0134841 A1    Jul. 15, 2004

(51) Int. Cl.  
B07C 5/34 (2006.01)

(52) U.S. Cl. .................. 209/599; 209/552; 209/553; 209/699; 73/41; 73/45; 73/49.3

(58) Field of Classification Search ................. 73/49.3, 73/45.4, 41; 209/699, 599  
See application file for complete search history.

(56) References Cited

U.S. PATENT DOCUMENTS

| 3,751,972 | A | * | 8/1973 | Hass ........................... 73/45.4 |
| 4,517,827 | A | * | 5/1985 | Tapscott ..................... 73/45.4 |
| 6,105,419 | A | * | 8/2000 | Michels et al. .............. 73/49.3 |

FOREIGN PATENT DOCUMENTS

| DE | 195 42 651 C1 | | 1/1997 |
| EP | 1 086 897 A2 | | 3/2001 |
| EP | 1086897 A2 | * | 3/2001 |
| GB | 2 259 776 A | | 3/1993 |
| GB | 2259776 A | * | 3/1993 |

* cited by examiner

Primary Examiner—Kathy Matecki  
Assistant Examiner—Terrell Matthews  
(74) Attorney, Agent, or Firm—Foley & Lardner LLP

(57) ABSTRACT

An apparatus for inspecting sealed packages having volumetric dimensions includes a frame having an inlet and an outlet side, conveyor means for conveying packages along a path of transport from the inlet side through said frame towards said outlet side, and first inspection means disposed adjacent to said conveyor means and pivotally connected to said frame, such that upon being contacted by a package located on said conveyor means said first inspection means are pivoted around at least a first pivoting point. The first inspection means includes first counteracting means for applying a first load on said package urging said first inspection means against said package to be tested, and means for generating a first indication of the volumetric dimensions of said package.

17 Claims, 3 Drawing Sheets

APPARATUS FOR INSPECTING SEALED PACKAGES

FIELD OF THE INVENTION

The invention relates to an apparatus for inspecting sealed packages having volumetric dimensions comprising a frame having an inlet and an outlet side, conveyor means for conveying packages along a path of transport from the inlet side through said frame towards said outlet side, and first inspection means disposed adjacent to said conveyor means and pivotally connected to said frame, such that upon being contacted by a package located on said conveyor means said first inspection means are pivoted around at least a first pivoting point.

BACKGROUND OF THE INVENTION

An apparatus according to the above is for example known from U.S. Pat. No. 6,105,419. In this patent an apparatus for inspecting sealed packages is disclosed, wherein first inspection means contacts the packages to be inspected and moves away from the conveyor means over a particular distance depending whether the package is properly sealed. When engaged by a properly sealed package the inspection means are moved a first distance, which causes an indicator or sensor to generate an "OK" or "GOOD" signal, which prevents the removal of the properly sealed package from the conveyor means.

However, when a leaky package, e.g. an improperly or inadequately sealed package contacts the inspection means, said means are moved a second distance, which is insufficient to cause the indicator or sensor to generate such a signal. Consequently, the package is classified as "FALSE" and removed from the conveyor means.

A major drawback of the apparatus as disclosed in U.S. Pat. No. 6,105,419 is that for a proper functioning the apparatus is only functional within a limited range of volumetric dimensions of the packages to be inspected, whereas the sealed packages to be inspected have to displace the inspection means a first distance in order to be classified as properly sealed packages. Any sealed package which does not displace the inspection means said first distance, fails to activate the indicator or sensor for generating a signal "GOOD", said package is classified as improperly or inadequately sealed, whereas in fact the sealed package could be good and is therefore unnecessary rejected.

Hence the apparatus according to U.S. Pat. No. 6,105,419 is limited to a certain type of package, thus requiring modification of the apparatus when another type of package having different volumetric dimensions has to be inspected.

Moreover, the apparatus according to U.S. Pat. No. 6,105,419 only gives an indication "GOOD" or "FALSE", and does not provide any accurate information concerning the actual volumetric dimensions of the individual sealed package.

SUMMARY OF THE INVENTION

The invention aims to overcome the above drawbacks of the prior art and to provide an apparatus for inspecting sealed bags at a higher rate and speed, which moreover gives a more accurate indication of the volumetric dimensions of each individual package and thus avoids an unnecessary rejection and removal of a properly sealed package.

According to the invention the apparatus is characterised in that first inspection means comprises first counteracting means for applying a first load on said package urging said first inspection means against said package to be tested; and means for generating a first indication of the volumetric dimensions of said package.

According to this aspect the inspection means are urged against the package to be inspected and any subsequent displacement of the first inspection means due to the volumetric dimensions of the package results in a signal directly related to said package, thus obtaining a direct indication of the volumetric dimension of said specific package to be inspected.

Hence the apparatus according to the invention is not limited to a specific limited range of volumetric dimensions of packages to be tested, but can be used for any type of package irrespective of their volumetric dimensions. It is therefore not necessary to adjust or to modify the apparatus for any type of packages to be tested.

In a more specific embodiment according to the invention the apparatus is characterised in that it further comprises load means disposed adjacent to said conveyor means and downstream to said first inspection means seen in the direction of transport of said package, said load means being pivotally connected to said frame for applying a static load on said package to be inspected.

Furthermore, said apparatus according to the invention may comprise second inspection means adjacent to said conveyor means and downstream to said load means seen in the direction of transport of said package, said second inspection means being pivotally connected to said frame, such that upon being contacted by said package said second inspection means are pivoted around at least a first pivoting point; and wherein said second inspection means comprises second counteracting means for applying a second load on said package urging said second inspection means against said package to be tested; and means for generating a second indication of the volumetric dimensions of said package.

These two additional features provide a very accurate and versatile apparatus for inspecting sealed packages, which apparatus is not only capable in inspecting sealed bags at a high speed and rate (at least 120/min but furthermore it obviates the drawbacks of the prior art concerning the rejection of a properly sealed package.

Whereas the first inspection means provides a user with a first indication concerning the volumetric dimensions of the package to be inspected, the load means exert a static load on the package to be inspected, e.g. pre-squeezing of the packages, in order to facilitate the discharge of air from improperly sealed or leaky packages. The second inspection means provides a second indication of the volumetric dimensions of said package, wherein according to the invention the apparatus further comprises processing means for determining whether said package is improperly or inadequately sealed using said first and second indications.

Thus the information obtained with the first inspection means can be considered as a reference value, whereas the information obtained with the second inspection means is used in order to determine whether a change between both first and second indications has occurred due to a possible leakage of the package to be inspected due to the static load applied by the load means.

In a specific embodiment said first and said second counteracting means each apply said first and second loads as a torque on their respective first pivoting points, and more in particular said first and second counteracting means each comprise a servo-motor connected with their respective first pivoting point through an endless belt transmission.

For obtaining proper information which can serve as an indication for the volumetric dimensions of the package to be tested according to the invention each servo-motor comprises encoding means.

In a specific embodiment said first and second inspection means as well as said load means each comprise a package-contact portion, each package-contact portion being pivotally around said first and a second pivoting point connected to said frame via a first and a second lever. More in particular each second lever of said first and second inspection means is provided with a counter-balance weight.

By mounting the first and second inspection means pivotally to said frame, wherein the first and second inspection means are outbalanced using a counter/balance weight, the construction itself and more in particular its weight does not influence the measurements to be performed on each package to be inspected. Therefore a more accurate measurement can be performed, obtaining precise information concerning the volumetric dimensions of the package. Therefore a more accurate decision can be made whether the package being inspected is properly or improperly sealed.

For applying said static load on each package by said load means, so called pre-squeezing, according to the invention said second lever of said load means is connected to a piston/cylinder-combination for applying said static load on said package. The use of a piston/cylinder-combination allows an accurate static load to be applied without unnecessarily damaging properly sealed packages.

In order to facilitate a smooth guidance of the packages to be tested through the frame of the apparatus each package-contact portion comprises an endless conveyor element passed over spaced-apart drivable rollers, whereas said conveyor means may further comprise an endless conveyor element passed over spaced-apart drivable rollers.

Furthermore, a proper handling of the packages through the apparatus can be improved as according to the invention each endless conveyor element of said package-contact portions and said conveyor means are driven with the same speed and direction. More in particular said apparatus comprises one motor for driving each endless conveyor element of said package-contact portions and said conveyor means whereas the endless conveyor elements of said package-contact portions and said conveyor means are linked together using suitable endless belt transmissions.

In a further embodiment of the apparatus according to the invention near said outlet side discharge means are present for removing an improperly or inadequately sealed package, wherein said discharge means may be part of said conveyor means and pivotable about an axis perpendicular to the path of transport. More in particular said discharge means may comprise an endless conveyor element passed over drivable rollers. With this feature it is possible to quickly and without errors remove "false" packages from the properly sealed packages.

BRIEF DESCRIPTION OF THE DRAWINGS

The invention will now be described with reference to drawings, which drawings show in.

DETAILED DESCRIPTION OF THE PREFERRED EMBODIMENTS

Figure 1:
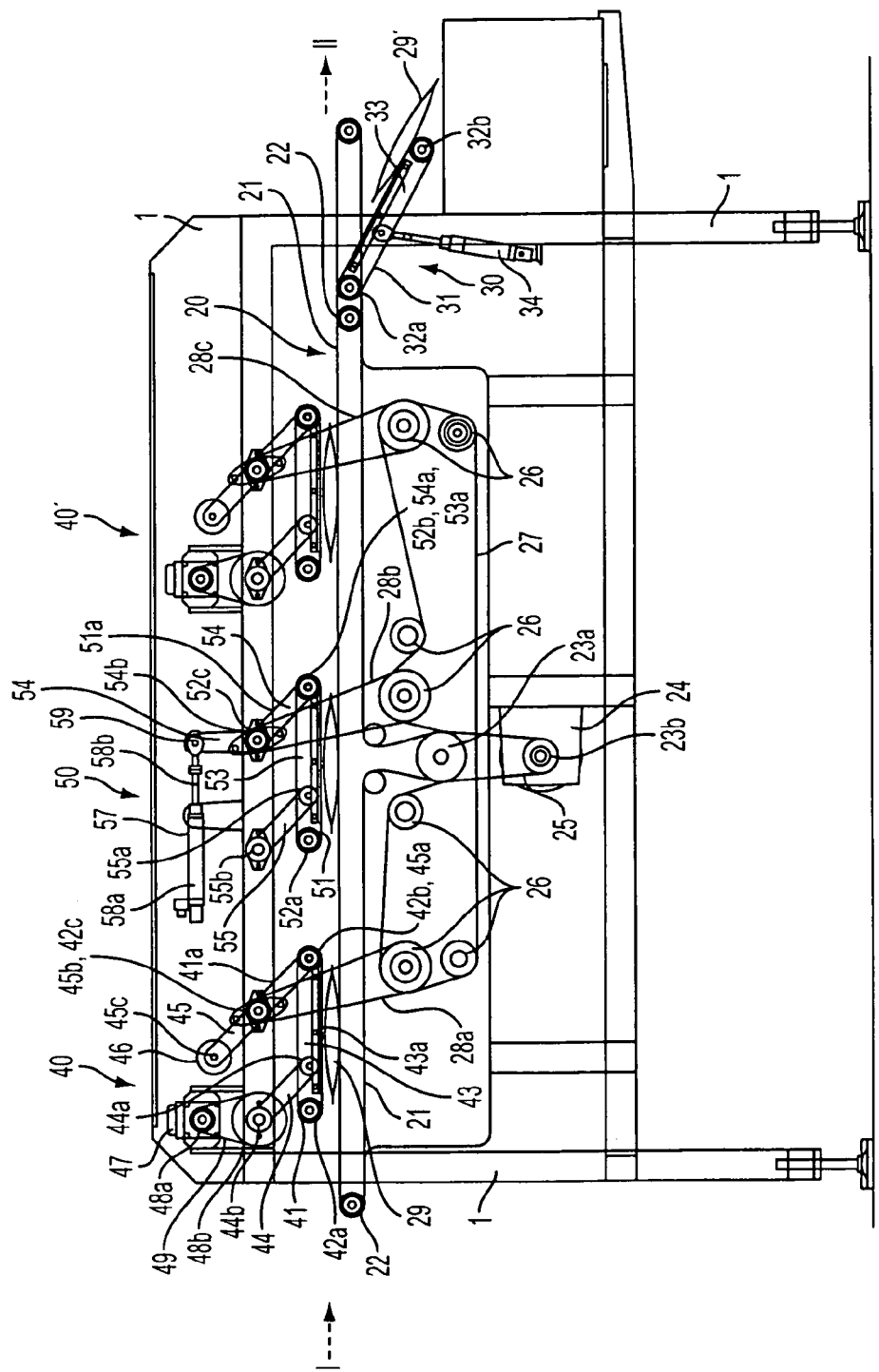
FIG. 1 a schematic side view of an embodiment of an apparatus for inspecting sealed packages according to the invention.
Figure 2:
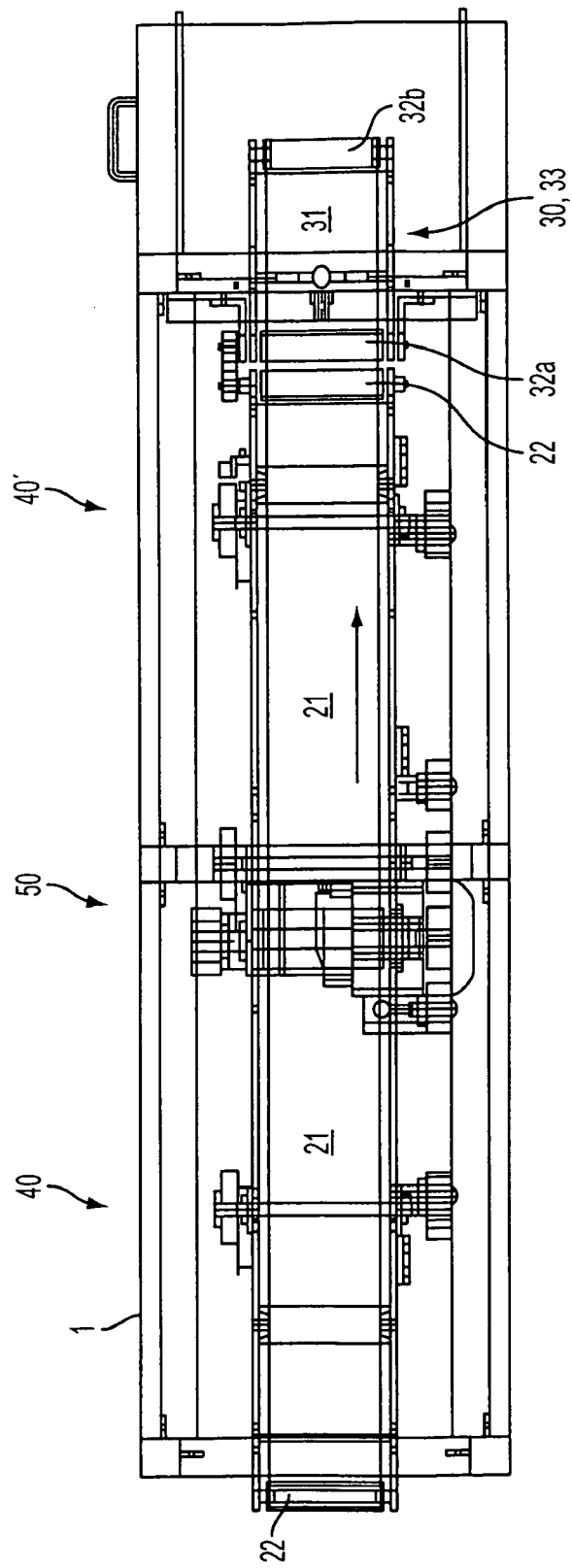
FIG. 2 a top plan view of the embodiment of the apparatus according to FIG. 1.
Figure 3:
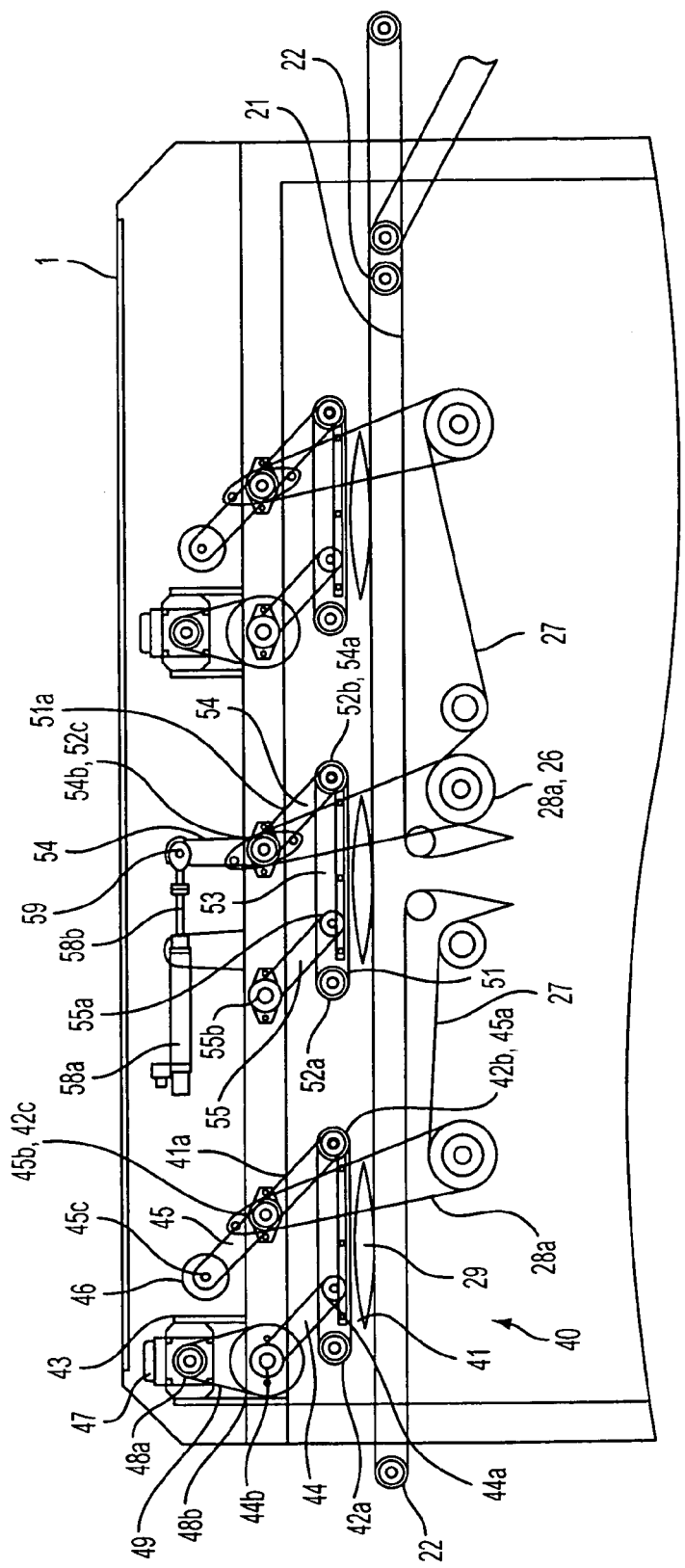
FIG. 3 a detailed view of a portion of the schematic side view of the embodiment of the apparatus shown in FIG. 1.

With reference to the FIGS. 1, 2 and 3 it is noted that all corresponding parts are indicated with the same reference numerals.

The embodiment of the apparatus according to the invention as shown in FIGS. 1—3 comprises a frame 1 having an inlet I and an outlet II. Mounted in said frame 1 are conveyor means 20 for conveying packages 29 along a part of transport from the inlet side I through said frame 1 towards said outlet side II. The conveyor means comprise an endless conveyor element 21 passed over a multiple of drivable rollers 22.

The apparatus for inspecting sealed packages further comprises first inspection means 40 which are disposed adjacent to said conveyor means 20 and which are pivotally connected to said frame 1. Due to the pivotal connection between the first inspection means and the frame 1, said inspection means 40 can be pivoted around a first pivoting point, here depicted with reference numeral 44b through said frame 1, once said inspection means are contacted by a package 29 located on said conveyor means 20.

Although in the prior art like U.S. Pat. No. 6,105,419 the amount of pivot can be used to distinguish between properly and improperly sealed bags, such a measurement approach is less accurate, whereas it is limited to a specific range of volumetric dimensions of said package as stated above.

Moreover, the pivotal construction of the inspection means according to the prior art may result in a bouncing, reciprocating movement of the inspecting means due to the sequential passage of the packages to be tested, resulting in incorrect measurements of the packages as well as malfunctions and standstill to the apparatus. Moreover, the known apparatuses according to the state of the art are known for their rather low speed in processing large numbers of packages.

The apparatus for inspecting sealed packages according to the invention aims to overcome this drawback and according to the invention said inspection means 40 are provided with counteracting means (47, 48a–48b, 49) which counteracting means apply a first load on said package 29 in order to urge the first inspection means 40 against the package 29 to be inspected.

The inspection means 40 comprises a support 43 provided with a package-contact portion 43a, which support is pivotally connected via a first lever 44 and a second lever 45 to said frame. Said support 43 is capable of pivoting via said first and second levers 44, 45 around said first pivoting point 44b and a second pivoting point 45b, whereas said support 43 is pivotally connected with said first and second levers via their ends 44a–45a.

According to the invention said second lever 45 is provided with its other end 45c with a counter-balance weight 46, such that the construction of the first inspection means 40 consisting of the first lever 44, the support 43, and the second lever 45 are weight-balanced through said counter-balance weight 46. In fact, the weight of said counter-balance weight 46 equals the weight of the support 43 and the levers 44–45. The function of said counter-balance weight 46 will be explained further in the description.

The counteracting means comprises a servo-motor 47 with a shaft 48a over which an endless belt 49 is passed. Said belt 49 is also passed over a roller 48b connected to said first lever 44 near the first pivoting point 44b.

According to the invention the apparatus for inspecting sealed packages also comprises second inspection means 40' which means are identical to the first inspection means 40. Hence for the sake of clarity no reference numerals are depicted in FIG. 1 relating to the second inspection means 40', however all parts of the second inspection means 40' have an identical counter part which forms part of the first inspection means 40. In the description the several parts of the second inspection means 40' will be denoted by the same reference number of their corresponding part of the first inspection means 40 followed by an apostrophe (').

The second inspection means 40' operates in an identical manner as the first inspection means 40 as will be explained later in the description.

The second inspection means 40' is disposed adjacent to the conveyor means 20 and downstream to the first inspection means 40, seen in the direction of transport of the packages 29.

Between the first inspection means 40 and the second inspection means 40' load means 50 are disposed adjacent to said conveyor means 20, which load means 50 are pivotally connected to said frame 1 via two pivotal points 54b and 55b. Also the load means 50 comprises a support 53 provided with a package-contact portion 53a, which support 53 is pivotally mounted within said frame 1 by means of a first lever 54 and second lever 55. The first lever 54 is pivotally connected around a first pivotal point 54b to said frame 1 and is connected with its other end 54a to the support 53. Likewise the second lever 55 is connected with a first end to said frame 1 near a second pivotal point 55b, whereas the lever 55 is connected with its other end 55a to said support 53.

The load means 50 exert a static load through said package-contact portion on the package 29 which is transported over the conveying means 20. In order to exert said static load on the package 29 th load means 50 comprise a piston/cylinder-combination 57 consisting of a piston 58b slidable mounted in a cylinder 58a. Said piston/cylinder-combination 57 may be a pneumatic or an electronically operated piston/cylinder-combination, whereas the piston 58b is connected with the free end 59 of the first lever 54. Therefore, by displacing the piston 58b within the cylinder 58a, the lever 54 is displaced and exerts via the pivotal points 54b and 55b and via said support 53 a static load on a package 29.

The Apparatus According to the Invention Operates as Follows:

Via the inlet I a large number of sealed packages to be inspected are transported along the conveyor means 20 through said frame 1. Near the first inspection means 40 the package 29 comes into contact with said package-service portion 43a of the support 43 of the first inspection means 40 and due to its volumetric dimensions said package 29 urges or displaces said support 43. Said support 43 thereby performs a pivotal movement around the first and second pivotal points 44b–45b. The amount of pivotal displacement of said support 43 can be regarded as an indication for the volumetric dimensions of the package to be inspected, however, as explained above, this is a less accurate approach and is moreover susceptible to errors like the unnecessary disapproval/rejection of a good package.

Moreover, due to the sequential contact of the support 43 and a large number of packages that may result in a bouncing, reciprocating pivotal movement of the support 43 around its pivotal points 44b–45b makes the measurement less accurate. Moreover, this also makes the construction more susceptible to wear and standstill.

In order to minimize the effect of the weight of the specific parts of the first and second inspection means, the second lever 45 is provided with its end 45c with a counter-balance weight 46, having a weight which is equal to the weight of the support 43 and the first and second levers 44–45. Therefore the measurement whether a package is properly sealed is only affected by the volumetric dimensions of the package 29, and thus provides a more accurate result.

In order to minimize the bouncing, reciprocating movement of the support 43 due to the subsequent contacts with the packages 29, the pivotal movement of said support 43 is counteracted by the belt transmission 48a–48b, 49 and said servo-motor 47. In fact, the servo-motor 47 urges the support 43 with its package-contact portion 43a always against the package 29 to be tested by applying continuously a torque on the first pivoting point 44b.

Thus, the servo-motor 47 urges the package-contact portion 43a to follow the contours of the volumetric package 29 and the pivotal displacement of the support 43 due to the package 29 results in displacement of the axis 48a of the servo-motor 47, which displacement can be detected by encoding means present in said servo-motor 47. In fact, the displacement of the support 43 due to the contours of the sealed package 29 results in a change in the load exerted by the servo-motor 47 on the pivoting point 45b, which change can be detected by the encoding means of the servo-motor 47. This change gives a direct, unambiguously first indication of the volumetric dimensions of the package 29 to be inspected.

Subsequently the package 29 to be inspected is guided over the conveying means 20 towards the load means 50 wherein a static load is exerted on the package 29. This static load can be considered as a pre-squeezing to facilitate any discharge of air from leaky packages. This static load is exerted on said package 29 using the piston/cylinder-combination 57.

Next, the package 29 is transferred towards the second inspection means 40', which second inspection means 40' operates in a similar manner as the first inspection means 40. In a similar manner the pivotal movement of the support 43' due to the package 29 is counteracted by a second load, which second load is exerted as a torque on the first pivoting point 44b' using a similar servo-motor 47'. Likewise, the package-contact portion 43a' has to follow the contours of the volumetric dimensions of the package 29.

The displacement of the support 43 due to the contours of the volumetric package 29 results in a change in the load or torque exerted by the servo-motor 47' on said first pivoting point 44b'. Said change can be detected by similar encoding means present on the drivable shaft 48a' of the servo-motor 47', which signal can be used as a second indication of the volumetric dimensions of the package 29.

By comparing both signals obtained from the encoding means of the servo-motor 47 of the first inspection means 40 and the encoding means of the servo-motor 47' of the second inspection means 40' using suitable processing means (not shown), it can be established whether said package to be inspected is properly or improperly sealed.

In the event of a properly sealed package 29, both signals will be equal to each other within small boundaries, whereas in the event of an improperly or inadequately sealed package, both signals will differ from each other. In the latter case a clear indication will be obtained that the package 29' in question is improperly sealed and has to be removed or separated from the properly sealed packages 29.

For this purpose the conveyor means 20 comprises discharge means 30 which consist of a support 33 provided with drivable rollers 32a–32b over which an endless conveyor element, for example a belt 31, is passed. The discharge means 30 are pivotable about an axis perpendicular to the part of transport of the packages 29, which axis is similar to the longitudinal axis of the roller 32a. The discharge means 30 are pivotable about the axis using a piston/cylinder-combination 34.

For a proper, smooth and quick transfer of the packages 29 all supports 43–43' and 53 of the first and second inspection means and the load means 50, respectively, are provided with at least two drivable rollers 42a–42b, 42a'–42b', 52a–52b, respectively over which an endless conveyor element 41, 41', 51, respectively is guided.

According to a specific aspect of the invention the endless conveyor elements 41–41'–51 and the endless conveyor element 21 of the conveyor means 20 are driven with the same speed and direction and are preferably driven by one motor 24 which is mounted in said frame 1. Using suitable endless belt transmissions said motor 24 drives the endless conveyor elements 41–41'–51 of the first and second inspection means 40–40' and the load means 50 as well as the endless conveyor element 21 of the conveyor means 20 with the same speed and direction.

The motor 24 is provided with a drivable roller 23b which drives an endless belt 25, which is passed over said drivable roller 23b as well as a central roller 23a. The central roller 23a drives in turn an endless central conveyor belt 27 which is passed over suitable rollers 26. Using separate endless belts 28a, 28b and 28c, which belts 28a–28b–28c each are passed over a roller 26 and a roller 42c–52c and 42c'. The rollers 42c–42c', 52c are mounted on the pivoting points 45b–45b', 54b of the first and second inspection means 40–40' and the load means 50, respectively.

Each endless belt 28a–28b–28c drives in turn a belt 41a–51a–41a', which belts are guided over the rollers 42c–42b of the lever 45 of the first inspection means, over rollers 52c–52b of the lever 54 of the load means 50, and over the rollers 42c'–42b' of the lever 45' of the second inspection means 40', respectively. These belts 41a–51a–41a' drive in turn the endless conveyor elements 41, 51, 41' of the first inspection means 40, the load means 50, and the second inspection means 40', respectively.

This ensures that the endless conveyor elements 41–51–41' as well as the endless conveyor element 21 of the conveyor means 20 are driven with the same speed and direction ensuring a proper transport of the packages 29 to be inspected through the apparatus.

It will be clear that with the above apparatus according to the invention a more accurate inspection of sealed packages can be obtained without the risk of rejecting a properly sealed package. With the apparatus according to the invention packages 29 can be inspected with a higher speed allowing an increased productivity in terms of inspected packages per time unit. With the embodiment as described in the accompanying drawings at least 120 packages can be inspected per minute, whereas the transport speed of the conveying elements can reach speeds of 1000 mm per second.

The priority application no. 02079318.8 filed in the European Patent Office (EPO) on Oct. 16, 2002, is incorporated herein in its entirety.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. An apparatus for inspecting sealed packages having volumetric dimensions comprising:
   a frame having an inlet and an outlet side;
   conveyor means for conveying packages along a path of transport from the inlet side through said frame towards said outlet side;
   first inspection means disposed adjacent to said conveyor means and pivotally connected to said frame, such that upon being contacted by a package located on said conveyor means said first inspection means pivots around at least a first pivoting point, wherein said first inspection means comprises first counteracting means for applying a first load on said package urging said first inspection means against said package to be tested;
   means for generating a first indication of the volumetric dimensions of said package;
   load means disposed adjacent to said conveyor means and downstream of said first inspection means seen in the direction of transport of said package, said load means being pivotally connected to said frame for applying a static load on said package to be inspected;
   second inspection means disposed adjacent to said conveyor means and downstream of said load means seen in the direction of transport of said package, wherein said second inspection means: (a) is pivotally connected to said frame, such that upon being contacted by said package said second inspection means pivots around at least a first pivoting point; and (b) comprises second counteracting means for applying a second load on said package urging said second inspection means against said package to be tested; and
   means for generating a second indication of the volumetric dimensions of said package.

2. The apparatus according to claim 1, further comprising processing means for determining whether said package is improperly or inadequately sealed using changes in said first and said second load.

3. The apparatus according to claim 1, wherein said first and said second counteracting means each apply said first and second loads as a torque on their respective first pivoting points.

4. The apparatus according to claim 3, wherein said first and second counteracting means each comprise a servo-motor connected with their respective first pivoting point through an endless belt transmission.

5. The apparatus according to claim 4, wherein each servo-motor comprises encoding means for detecting said changes in said first or second load.

6. The apparatus according to claim 1, wherein said first and second inspection means as well as said load means each comprise a package-contact portion, each package-contact portion pivoting around said first and a second pivoting point connected to said frame via a first and a second lever.

7. The apparatus according to claim 6, wherein each second lever of said first and second inspection means is provided with a counter-balance weight.

8. The apparatus according to claim 6, wherein said second lever of said load means is connected to a piston/cylinder-combination for applying said static load on said package.

9. The apparatus according to claim 6, wherein each package-contact portion comprises an endless conveyor element passed over spaced-apart drivable rollers.

10. The apparatus according to claim 1, wherein said conveyor means comprises an endless conveyor element passed over spaced-apart drivable rollers.

11. The apparatus according to claim 9, wherein each endless conveyor element of said package-contact portions and said conveyor means are driven with the same speed and direction.

12. The apparatus according to claim 9, wherein said apparatus comprises one motor for driving each endless conveyor element of said package-contact portions and said conveyor means.

13. The apparatus according to claim 12, wherein the endless conveyor elements of said package-contact portions and said conveyor means are linked together using endless belt transmissions.

14. The apparatus according to claim 1, wherein near said outlet side, discharge means are present for removing an improperly or inadequately sealed package.

15. The apparatus according to claim 14, wherein said discharge means are part of said conveyor means and pivotable about an axis perpendicular to the path of transport.

16. The apparatus according to claim 15, wherein said discharge means comprises an endless conveyor element passed over drivable rollers.

17. An apparatus for inspecting sealed packages having volumetric dimensions comprising:
   a frame having an inlet and an outlet side;
   a conveyor that conveys packages along a path of transport from the inlet side through said frame towards said outlet side;
   a first inspection unit disposed adjacent to said conveyor and pivotally connected to said frame, such that upon being contacted by a package located on said conveyor, said first inspection unit pivots around at least a first pivoting point, wherein the first inspection unit comprises a first counteracting device for applying a first load on said package urging said first inspection unit against said package to be tested;
   a first encoder for detecting a change of load exerted by the first counteracting device as a first indication of the volumetric dimensions of said package;
   a loader disposed adjacent to said conveyor and downstream of said first inspection unit seen in the direction of transport of said package, said loader being pivotally connected to said frame for applying a static load on said package to be inspected;
   a second inspection unit disposed adjacent to said conveyor and downstream of said loader seen in the direction of transport of said package, wherein said second inspection unit: (a) is pivotally connected to said frame, such that upon being contacted by said package said second inspection unit pivots around at least a first pivoting point; and (b) comprises a second counteracting device for applying a second load on said package urging said second inspection unit against said package to be tested; and
   a second encoder for detecting a change of load exerted by the second counteracting device as a second indication of the volumetric dimensions of said package.

* * * * *